United States Patent

Magiros et al.

Patent Number: 6,081,509
Date of Patent: Jun. 27, 2000

[54] SIMULATOR FOR MULTIPLE NETWORK INTERFACE UNITS

[75] Inventors: Yannis Magiros, Parsippany; Stuart Warmink, Morristown, both of N.J.

[73] Assignee: Lucent Technologies Inc., Murray Hill, N.J.

[21] Appl. No.: 09/034,083

[22] Filed: Mar. 3, 1998

[51] Int. Cl.$^7$ .................................................. H04L 12/26
[52] U.S. Cl. .......................... 370/241; 379/29; 370/463; 714/712; 714/741
[58] Field of Search .................................... 370/241, 245, 370/250, 251, 400, 401, 409, 419, 420, 463; 379/10, 29; 375/224; 709/250; 714/712, 738, 741, 442

[56] References Cited

U.S. PATENT DOCUMENTS

| | | | |
|---|---|---|---|
| 5,799,060 | 8/1998 | Kennedy et al. | 379/29 |
| 5,835,566 | 11/1998 | Cowgill | 379/10 |
| 5,850,426 | 12/1998 | Watkins et al. | 379/29 |
| 5,920,608 | 7/1999 | Minigishi | 379/1 |
| 5,943,318 | 8/1999 | Badiee | 370/248 |
| 6,009,079 | 12/1999 | Boye et al. | 370/242 |

*Primary Examiner*—Alpus H. Hsu
*Assistant Examiner*—Ahmed Elallam
*Attorney, Agent, or Firm*—Steve Mendelsohn

[57] ABSTRACT

A special network interface unit (NIU) for a communication system, called a super NIU, simulates operations of multiple NIUs, called virtual NIUs, for such purposes as testing other components of the communication system. The super NIU has a real (i.e., actual) NIU that communicates with a message simulator implemented on a PC configured with the actual NIU. The component to be tested (e.g., the host digital terminal of the communication system) sends downstream messages intended for the virtual NIUs to the super NIU, which handles the downstream messages, generates any necessary upstream messages from the virtual NIUs, and transmits the upstream messages back to the component. In one embodiment, some of the downstream messages are handled by the actual NIU without assistance from the computer, while, for other downstream messages, the computer receives and processes the downstream messages from the actual NIU, and generates and transmits any necessary upstream messages from the virtual NIUs back to the actual NIU, which forwards the upstream messages to the component to be tested.

26 Claims, 3 Drawing Sheets

SIMULATOR FOR MULTIPLE NETWORK INTERFACE UNITS

BACKGROUND OF THE INVENTION

1. Field of the Invention

The present invention relates to communication systems, and, in particular, to equipment for testing components of hybrid fiber/coax (HFC) communication systems.

2. Description of the Related Art

A network interface unit (NIU) is a component of a hybrid fiber/coax communication system that converts radio frequency signals over a coax cable into telephony and video signals. In an HFC communication system, communication signals are conveyed between a central office (CO) and an array of NIUs over a combination of linear lightwave networks (e.g., over optical fibers) and coaxial cable networks. The CO contains a host digital terminal (HDT) and other communications equipment, such as video amplifiers, receivers, and transmitters. Communication signals originating from sources (e.g., interoffice networks, cable-access television (CATV), video, and other broadband services) external to the CO are sent to the HDT and the other equipment at the CO. These signals are formatted and transmitted to the NIUs by the HDT and the other equipment at the CO in accordance with a communication protocol and format being followed by the HFC communication system.

The NIUs are electrically connected to and communicate with customer premises equipment (CPE). CPE may include such devices as telephones, computers, television receivers, and other communication equipment. The NIUs process the messages and communication signals from the CO, format the signals, and transmit the signals to the proper customer equipment. The NIUs also transmit responses to the HDT as well as unsolicited messages (e.g., off-hook indication) in accordance with the system protocol. Most of the communication signals and all of the messages received by the NIUs are transmitted by the HDT. In addition to transmitting communication signals to NIUs throughout the network, the HDT also receives messages from the NIUs. The HDT must be able to identify the type of the received signal, associate that signal with a particular NIU, transfer the received communication signal to the proper external network or service, and, if necessary, properly respond to the particular NIU that sent the signal. The HDT must also be able to detect new NIUs that have been added to the communication system and assign identification numbers to these NIUs.

In designing and testing such an HFC communication system, it becomes very impractical to test the proper functioning of the HDT and the communication between the HDT and the NIUs in an HFC communication system that contains a relatively large amount of NIUs. That is, in order to test an HDT's ability to communicate randomly with any of the NIUs at any particular time, an actual HFC communication system containing all required NIUs could be constructed. This would not only be costly and time consuming, it would severely retard the design and development of such communication systems.

SUMMARY OF THE INVENTION

The present invention is directed to test equipment that can simulate the concurrent operations of a large number of network interface units. Such test equipment enables a component of a communication system, such as the host digital terminal of a hybrid fiber/coax (HFC) system, to be tested without having to configure the component with a large number of actual NIUs. The test equipment, referred to as a super NIU, can perform operations of a plurality of virtual NIUs, including receiving from the component being tested downstream signals intended for the virtual NIUs, processing those signals, and generating and transmitting appropriate upstream signals from the virtual NIUs back to the component being tested.

In one embodiment, the present invention is an apparatus for testing a component of a communication system. The apparatus comprises (a) an actual network interface unit, configured to transmit and receive signals to and from the component; and (b) a computer configured to transmit and receive signals to and from the actual NIU and programmed to simulate operations of a plurality of virtual NIUs. The actual NIU receives from the component being tested downstream signals intended for the virtual NIUs; the actual NIU and the computer handle the downstream signals for the virtual NIUs; the actual NIU and the computer generate upstream signals from the NIUs; and the actual NIU transmits the upstream signals from the virtual NIUs to the component, wherein, from the perspective of the component, the component appears to be communicating with a plurality of actual NIUs.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

As described earlier, the present invention is directed to test equipment that can simulate the concurrent operations of a large number of network interface units (NIUs) of a communication system. Such test equipment enables components of a communication system to be tested without having to configure the component with a large number of actual (or real) NIUs.

In one embodiment, the present invention is an apparatus, which includes an actual NIU, referred to as a super NIU, interfaced with a computer. The computer can be a personal computer (PC), a mainframe computer, or any other suitable combination of various well-known computer equipment. The super NIU can be interfaced with the host digital terminal (HDT) of a hybrid fiber/coax (HFC) system, and the super NIU and the computer can be programmed to simulate operations of a plurality of NIUs that communicate with the HDT in accordance with a communication protocol and format being followed by the communication system, thus eliminating the need to construct and install dozens of actual NIUs in order to test the system. For the sake of clarity, the present invention will be described within the context of a particular HFC communication system known as the HFC-2000® system (HFC-2000® is a registered trademark of Lucent Technologies, Inc. of Murray Hill, N.J.)

Figure 1:
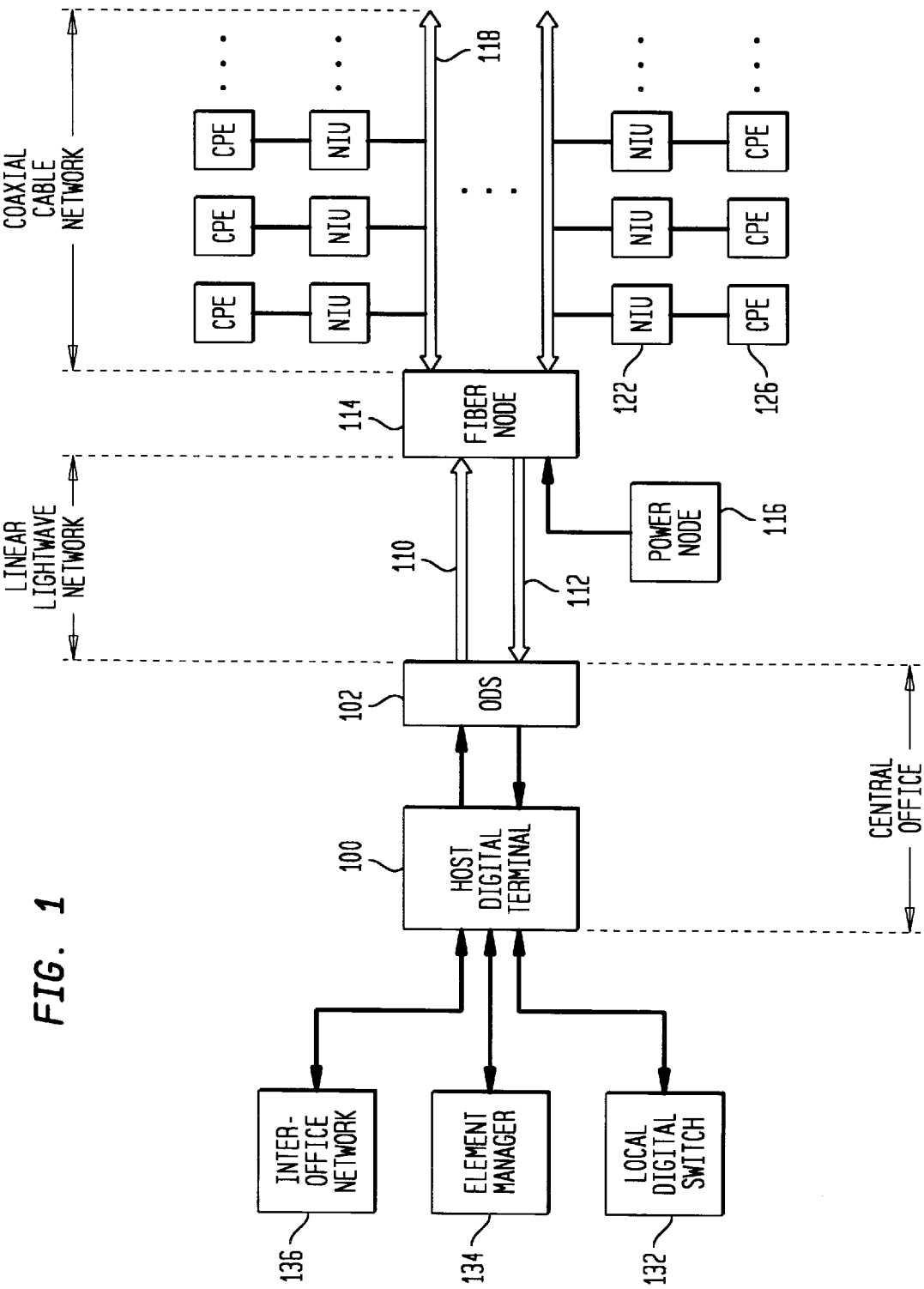
FIG. 1 is a high-level block diagram of a communication system, according to one embodiment of the present invention.

FIG. 1 is a high-level block diagram of the HFC-2000® system. The HFC-2000® system was designed and manufactured by Lucent Technologies. Although the present invention will be described in the context of the HFC-2000® system and the communication format and protocol followed by that communication system, the use and application of the present invention is by no means limited to this particular HFC communication system or its communication protocol and format. In fact, the present invention can be implemented to test components of communication systems other than hybrid fiber/coax systems.

At the central office, host digital terminal (HDT) 100 receives various communication signals and messages from sources such as inter office network 136, element manager 134, and local digital switch 132. HDT 100 interfaces with lightwave network equipment that converts all electrical signals to optical signals. Optical distribution shelf (ODS) 102 serves as an electrical-to-optical and optical-to-electrical converter of the communication signals transmitted and received by HDT 100 over the linear lightwave network. In addition to the communication signals, the linear lightwave network may carry video signals from broadband services (not shown). Optical signals transmitted from the CO are carried on optical cables represented by cable 110. Conversely, optical signals received by the CO are carried on optical cables represented by cable 112.

Fiber node (FN) 114 is a component external to the CO that converts (1) optical signals from the CO into electrical signals for the NIUs 122 and (2) electrical signals from the NIUs into optical signals for the CO. FN 114 has a coaxial cable interface (not shown) that allows it to connect to coaxial cables 118, from which one or more NIUs are connected at taps. A power node 116 provides electrical power to FN 114, to linear amplifiers (not shown) connected along the coaxial cables, and to the NIUs.

In the HFC-2000® system, each coaxial cable 118 can be connected to up to 120 NIUs and each fiber node 114 can be connected to up to 4 coaxial cables, for a total of 480 NIUs per fiber node. Each coaxial cable with its corresponding NIUs is referred to as a block converter group (BCG). The NIUs interface with customer premises equipment (CPE) 126, such as telephones, computers, television receivers, and other communication devices. The interfaces may include twisted copper wires connected to telephony devices and/or coaxial cables for broadcast video, video dial tone, and other broadband services.

The HFC-2000® communication system follows a particular protocol, whereby the communication signals are formatted by HDT 100 and transmitted to a particular NIU within the system. Each NIU is assigned an identification (ID) number whose function is discussed later on in this specification. The receiving NIU performs the proper format conversion of the received signal in accordance with the protocol, and, if necessary, responds to messages that may have been embedded in the signal. The receiving NIU also processes the communication signals (voice, video, etc.) and then transmits the signals to the proper CPE. The NIUs also transmit communication signals and messages to the HDT via the coaxial cable network and the linear lightwave network. FN 114 converts the electrical signals from the NIUs to optical signals for transmission over the linear lightwave network. All messages and communication signals transmitted by an NIU are formatted in accordance with the protocol so that they can be recognized and processed by HDT 100.

Both the linear lightwave network and the coaxial cable network are bidirectional. Signals transmitted from the CO to the NIUs are referred to as downstream signals and signals transmitted from the NIUs to the CO are referred to as upstream signals. The HFC-2000® system uses the well-known technique of frequency division multiplexing to allocate frequency bands of operation for upstream and downstream signals, thus achieving the bidirectional communication between each of the NIUs and the CO. For downstream signals such as voice-grade signals and other digital services and system control signals, the defined frequency band of operation is 700 to 750 MHz. For downstream broadcast video services (e.g., standard CATV analog signals) the frequency band of operation is 54 to 550 MHz. Upstream coaxial cable signals including voice-grade, broadcast video control, other broadband services, and system messages generated by various system equipment operate in the 5 to 40 MHz frequency range. Upstream optical fiber signals operate in the 120 to 407 MHz frequency range.

Figure 2:
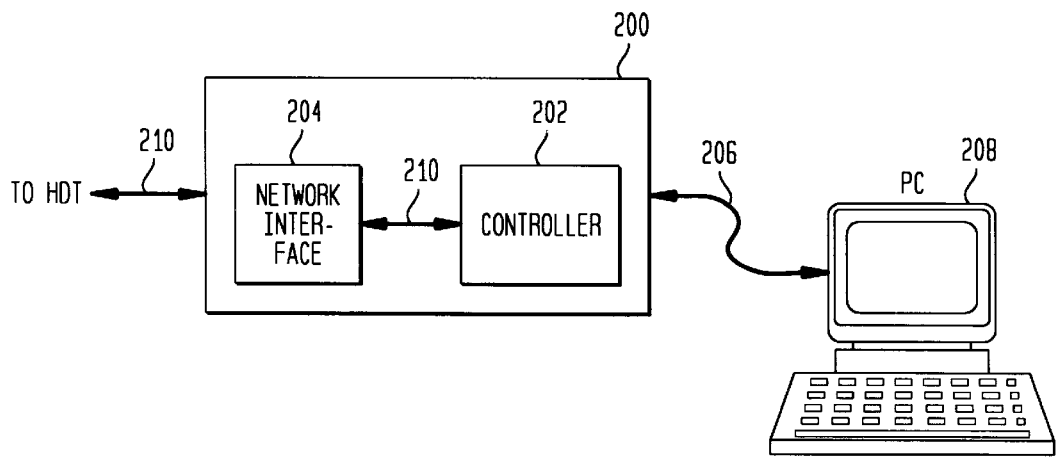
FIG. 2 depicts the physical configuration of a super network interface unit (NIU), according to one embodiment of the present invention.

FIG. 2 depicts the physical configuration of test equipment, according to one embodiment of the present invention. The test equipment of FIG. 2 can simulate the existence of a plurality of NIUs with which a host digital terminal of an HFC communication system can communicate. The test equipment comprises super NIU 200 interfaced with computer 208 (e.g., a personal computer) via serial link cable 206. Computer 208 implements software (e.g., discrete state machines) to simulate operations of one or more virtual NIUs. Computer 208 also provides graphical user interfaces to provide information to and receive instructions from the user. The software implemented by computer 208 for supporting the virtual NIUs is referred to as the message simulator, because it assists in the processing of downstream messages received from the host digital terminal for the virtual NIUs as well as the generation of upstream messages to be transmitted to the HDT from the virtual NIUs.

Super NIU 200 is an actual NIU that can perform functions of a typical NIU. A conventional communication system may comprise a plurality of typical NIUs located remotely from a common element (e.g., a host digital terminal) that forms a common interface to the rest of the communication system. Each typical NIU provides the local interface between one or more customers and the common element. Such an architecture optimizes the efficiency and economy of providing network access to customers who are remotely located and widely distributed relative to the common element.

In addition, super NIU 200 has been programmed to perform certain functions related to the support of virtual NIUs. As used in this specification, the term "host NIU" refers to the components and functionality of super NIU 200 corresponding to a typical NIU. The term "super NIU" refers to the augmented NIU which can perform both typical NIU functions and functions supporting the virtual NIUs. The term "virtual NIU" refers to the functionality supported by super NIU 200 and computer 208 to simulate an NIU. Super NIU 200 and computer 208 are configured to simulate the existence of a plurality of virtual NIUs.

Super NIU 200 comprises network interface 204 and controller 202. Network interface 204 has the proper mechanical coupling (not shown) to interface with the coaxial cable network of FIG. 1. Network interface 204 is connected to controller 202 by digital link 210. Digital link 210 is a bidirectional link that carries digital information conveyed between network interface 204 and controller 202. Network interface 204 converts downstream signals received from an HDT over a linear lightwave network into a format appropriate for transmission to controller 202 via digital link 210. Similarly, network interface 204 converts upstream signals received from controller 202 over digital link 210 into a format appropriate for transmission to the HDT over the linear lightwave network. Controller 202 determines for which NIU a received downstream message is intended, determines whether a response is necessary, and, if so, whether super NIU 200 will respond to the message without assistance from computer 208 or whether the response is to be formulated with the assistance of computer 208. When a response to an incoming message is to be formulated by computer 208, the incoming message is transferred to computer 208 via serial link cable 206. The format used to transfer data from super NIU 200 to PC 208 over serial link cable 206 is the well-known RS-232c standard.

The configuration of FIG. 2 simulates interactions with the HDT, where some messages are handled by super NIU 200 and others by computer 208, depending on the complexity of the interaction. In general, computer 208 responds to incoming messages that cannot be handled by super NIU 200 alone and has a graphical user interface (GUI) (see FIG. 4) that allows an operator of the system to create and delete virtual NIUs corresponding to different types of NIUs (e.g., different hardware version and/or different software versions). Computer 208 can display all of the messages for debug purposes or real-time message monitoring. Computer 208 also allows an operator to generate upstream messages to the HDT and determine and display the overall status of all the NIUs in the system. Each virtual NIU, which may be implemented as a discrete state machine on computer 208, follows the protocol of the HFC-2000® communication system and thus allows the operator to test the ability for communication between the HDT and any of the virtual NIUs. From the perspective of the HDT, the HDT appeals to be communicating with a plurality of actual NIUs, where the host NIU and any virtual NIUs appear to be actual NIUs. Super NIU 200 and computer 208 operate in conjunction to generate and delete virtual NIUs that are able to communicate with the HDT of an HFC system in accordance with the protocol and format being followed by that system.

As described above, the HFC-2000® system can handle up to 120 NIUs per block converter group (i.e., a coax cable and its subtending NIUs). Super NIU 200 can be used to test components, such as the HDT, of an HFC-2000® system, without having to equip the HDT with many NIUs for in-house testing. Super NIU 200 works in combination with a message simulator implemented on PC 208 to simulate as many virtual NIUs as is needed to test the system. These virtual NIUs are only virtual in the sense that they have no NIU hardware of their own. From the HDT's point of view, they will appear to be actual NIUs in almost all other respects. One super NIU is required for each BCG, and two or more such super NIUs can be configured to simulate the operations of two or more BCGs.

As described above, the super NIU is part actual NIU, part virtual NIUs. In theory, the super NIU could perform the same functions that a regular NIU performs, including, for example, actual call processing and testing functions. In practice, however, all such functions might not be supported in order to free up both RAM and CPU time to handle the large number of virtual NIUs that are supported. The host NIU always exists and has a fixed ID as per regular NIUs. In addition, there may be one or more virtual NIUs that are created and deleted in the super NIU via virtual NIU control messages sent over the debug serial link (206 in FIG. 2) from the message simulator (i.e., PC 208). The super NIU contains a data base that represents the virtual NIUs that are part of the super NIU. Each entry lists a virtual NIU's 64-bit ID, associated 16-bit data link connection identifier (DLCI), state, and other data items. Each NIU uses it own preassigned 64-bit ID for initial startup, and is then assigned a unique 16-bit DLCI that is used for all future message communications. The number of virtual NIUs contained in a super NIU is really only limited by the NIU's free RAM space and CPU time (1 host NIU plus 127 virtual NIUs is assumed). The host and virtual NIUs are identified via a "virtual NIU index" that is controlled by the message simulator. All super NIU/message simulator messages contain this index.

The message simulator takes care of creating/assigning NIU IDs and types (e.g. different NIU hardware and/or software versions), while the super NIU takes care of lower level start-up functions such as ranging and handshaking. During ranging, short messages containing serial numbers are sent from an NIU to the HDT. These ranging messages are used (1) to identify the NIU to the HDT and (2) by the HDT to determine the timing distance between the NIU and the HDT. In this context, handshaking refers the sequence of messages that establishes initial communications between the NIU and the HDT. After a virtual NIU sends one or more ranging bursts, receives a startup request message, and sends a startup reply message, the virtual NIU will have a logical address called a data link connection identifier (DLCI) associated with it, chosen by the HDT. The super NIU will then inform the message simulator of the new ID/DLCI association. At this point, the super NIU can identify any downstream messages that are destined for either the host NIU or one of the virtual NIUs and handle the messages appropriately. This allows the super NIU to share a BCG with other actual NIUs, if so desired.

Once the super NIU has determined a message is addressed to either the host NIU or one of the virtual NIUs, it can then determine how to handle/route this message. One approach is that the super NIU handles most messages addressed to the host NIU by itself, and messages addressed to a virtual NIU are either handled by the super NIU or passed on to the message simulator as appropriate. For instance, simple requests/commands that are not limited by the virtual NIUs sharing just one set of hardware are handled by the super NIU itself, and messages requiring perhaps a response from a virtual NIU or variable response are handled by the message simulator. In the case of messages being responded to or originating from the message simulator, the super NIU will send them on to the HDT assuming that the virtual NIU corresponding to the DLCI contained in the message matches that of an active virtual NIU.

The main advantage of such an hybrid scheme is that it limits the need for the PC's interaction for simple and/or common message exchanges, while at the same time leaving enough flexibility in the combined system to add more features and message handling capabilities in the message simulator as the need arises. In one embodiment, the message simulator supports only enough functionality to create/delete virtual NIUs and maintain some simple virtual NIU state information in order to re-request NIU create (which causes a ranging burst to be sent) if either the first create did not result in an acknowledgment from the super NIU that the requested NIU was up, or on recovery from RSF (received signal failed) (as indicated by the super NIU) when all virtual NIUs need to be forced to range again. In addition, the message simulator is able to provide "canned" responses to some common requests by the HDT, such as software version and equipage request, since the super NIU cannot know what responses are expected by the HDT.

The super NIU behaves exactly like an actual NIU from an RF point of view and could in theory handle all messages addressed to it itself. However, in practice, in order to create enough RAM and CPU time to be able to accommodate the many virtual NIUs that co-exist with the host NIU in the same super NIU, some functions such as call processing may be specifically disabled and messages targeted at such functions will simply be handed over to the message simulator. Call processing refers to the messages and actions that are specifically related to handling phone calls.

Since all virtual NIUs in a super NIU share the same physical hardware, according to one embodiment of the present invention, there are some restrictions on virtual NIU operation:

One super NIU is required for each BCG—all virtual NIUs use the same channel group in order to send messages on frequencies consistent with that BCG/receivers. Hence, a super NIU need "only" simulate up to 120 or so NIUs.

No call processing—since the super NIU does not have any customer premises equipment associated with it. In an alternative embodiment, a super NIU could be configured to simulate such call processing activities.

No hardware specific operations for virtual NIUs—the best way to test hardware specific operations is to configure one or more actual NIUs along with the super NIU.

Super NIU Implementation Details

The super NIU contains a data base that represents all virtual NIUs. This database contains the 64-bit ID, data link connection identifier (DLCI), NIU type, and state for each virtual NIU. One special use of the state information is for the super NIU to make sure that on sending a message that the state associated with its virtual NIU index is "active," otherwise an old queued up message might be sent for an NIU that had been deleted while the message was already on the transmit queue. The state information ("inactive," "waiting for startup request," or "active") could be used for debug reasons.

On the HDT side, the super NIU identifies messages to and from a particular virtual NIU by the DLCI. On the PC simulator side, virtual NIUs are identified via the virtual NIU index 0-N. In addition, the receiving of a message from the HDT destined for a virtual NIU and the sending of the corresponding reply from that same virtual NIU are asynchronous actions. Thus, messages need to remain associated with virtual NIUs while queued up within the super NIU.

In this embodiment, the super NIU will compare the DLCI in a downstream message against the super NIU's virtual NIU database. If the DLCI exists in the database, the DLCI in the message will be replaced by the corresponding virtual NIU index. Otherwise, if the DLCI does not exist in the database, the message will simply be discarded. Typically, a validated message will be entered on a message queue and handled at a later time by the appropriate part of the super NIU software. On handling the message, the super NIU can take one of three actions: (1) the message needs no further handling and can be discarded, (2) the message requires a response that can be handled by the super NIU itself, or (3) the message requires a response that cannot be handled by the super NIU and must be sent to the PC for farther processing.

In case (2), on sending the upstream reply, the virtual NIU index is converted into the DLCI prior to message transmission. In case (3), if the PC determines that an upstream response is required, it will send a message containing the virtual NIU index to the super NIU. The super NIU will first determine if the upstream message is a super NIU control message (e.g., creation or deletion of a virtual NIU) based on the message type. If it is not a special super NIU message, the super NIU will translate the virtual NIU index into the corresponding DLCI prior to upstream message transmission.

The advantage of using NIU indices exclusively within the super NIU for identifying virtual NIUs is that it takes up less space within the message (allowing a spare message header byte to be used in this embodiment) and that it presents a consistent method for sending upstream messages, both for super NIU and PC originated messages.

In one embodiment, the super NIU uses a special scheme when searching for ID or DLCI matches, based on knowledge of the information contents of those data items. For instance, the ID has a fixed format, for example, "00 5fLL YY MM DD SS SS", where the first digits (00 5fLL YY) are most likely the same and only the serial number part at the end (MM DD SS SS) changes. This suggests a searching strategy in which the ID comparison is performed by starting with the last bytes of each ID first, since that way a negative match is found much quicker than if the compare checked the mostly fixed bytes first. The same reasoning can be applied to the DLCI comparison, since the least significant byte of the 16-bit word is likely to change more than the most significant byte.

Scenarios

Figure 3:
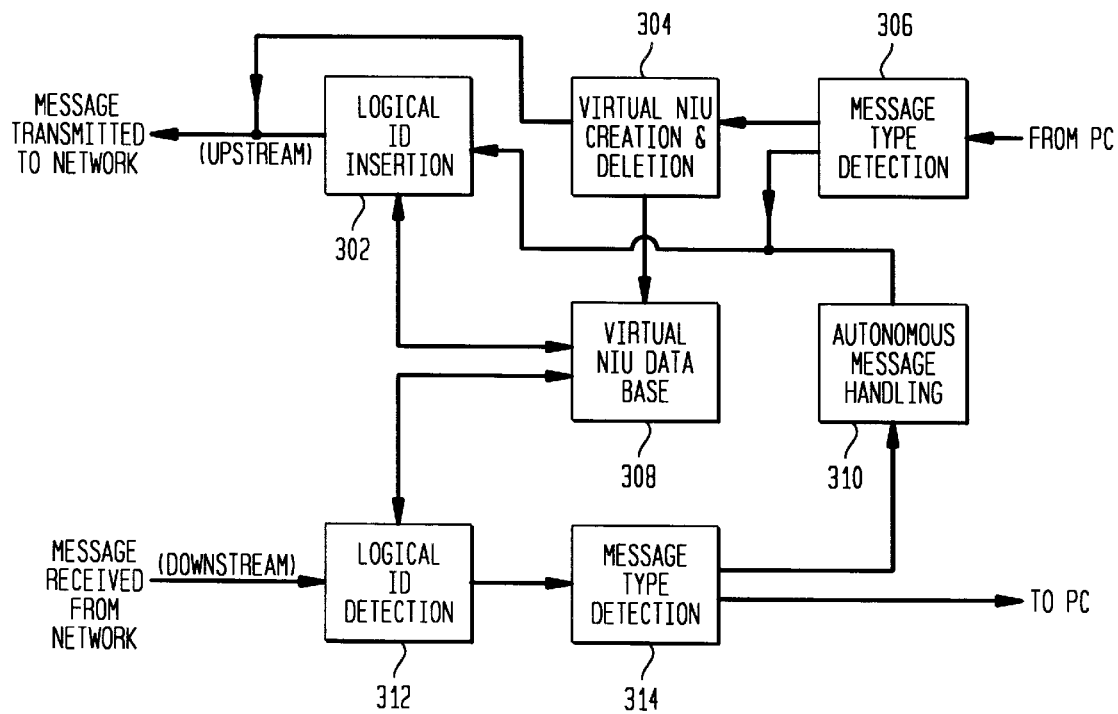
FIG. 3 shows a software block diagram of the super NIU of FIG. 2.

FIG. 3 shows a software block diagram of super NIU 200 of FIG. 2, according to one embodiment of the present invention. Virtual NIU data base 308 contains information about the "active" virtual NIUs, including virtual NIU #0 which is reserved for the host NIU. Logical ID detection block 312 uses the information in the virtual NIU data base 308 to compare the logical ID in each downstream message received from the HDT against those contained in the database. Message type detection block 314 determines whether the message is to be handled by the super NIU alone or whether assistance is needed from the PC. If the super NIU is to handle to message, then autonomous message handling block 310 processes the message and, if a response is to be transmitted back to the HDT, logical ID insertion block 302 inserts the appropriate logical ID found in the virtual NIU data base 308. Similarly, message type detection block 306 determines whether or not a message from the PC is a request for the creation/deletion of a virtual NIU. If so, virtual NIU creation & deletion block 304 handles the request. Otherwise, the super NIU passes the message on to logical ID insertion block 302 to format the message for transmission to the HDT. The following sections provide further information regarding the interactions between the super NIU and the message simulator for various commonly used scenarios.

Super NIU Start-Up

At start-up, the super NIU clears its virtual NIU database and performs ranging and start-up hand-shaking with the HDT to notify the HDT of the host NIU's presence and to allow the HDT to provide the host NIU with a data link connection identifier (DLCI), as well as adjusting the NIU's transmit power level and notifying the NIU of its block converter group (i.e., coax run). Following completion of this initial NIU-HDT interaction sequence, the host NIU is entered into the data base as virtual NIU index #0, and the super NIU sends a message to the message simulator to inform the latter that the super NIU is ready to add virtual NIUs. Handling the host NIU in the same manner as virtual NIUs simplifies the checking of received DLCIs and the (re)insertion of transmit DLCIs. Virtual NIU index #0 is reserved for the host NIU. The message simulator should assign an overall "readiness" state to the super NIU based on the active/inactive state of virtual NIU index #0, and only allow virtual NIU operations when NIU #0 is active.

Adding a Virtual NIU

The message simulator sends a message to the super NIU to request activation of a virtual NIU. This message contains the 64-bit ID and NIU type. If the state of virtual NIU #0 is "active," the super NIU updates its database for the given virtual NIU index and sends a ranging burst for that virtual NIU to the HDT, even if the data was a duplicate of what was there before. Then, on receiving a start request message (this is a broadcast message, which can be recognized by its special broadcast DLCI), the ID contained within that message is compared against those of the virtual NIUs known by the super NIU. If there is a match, the DLCI that is also contained within the startup request messages is added to the data base for that same virtual ID, a startup reply message is sent to the HDT, and an activate virtual NIU reply message for that virtual NIU index is sent to the message simulator containing the ID (for double checking) and DLCI. The message simulator does not need to know the DLCI but this information might be useful for debugging purposes. If no startup request is received in response to the ranging burst, then it is up to the message simulator to try again until it receives the activate virtual NIU reply message from the super NIU.

Handling a Downstream Message

On receiving a downstream message, the super NIU compares the received data link connection identifier (DLCI) against those contained in its virtual NIU database. If the DLCI is the broadcast DLCI, or the DLCI matches that of one of the (active) virtual NIUs, the message is added to the NIU's application queue (adding the virtual NIU index to the message for later reference), otherwise it is discarded. On receiving a message, the internal application software will first determine if this message can be handled within the super NIU or if it needs to be pa on to the message simulator.

Assuming the message is handled by the super NIU itself (e.g., a poll request message), the super NIU will create an appropriate response message and send it upstream. The super NIU will place the appropriate DLCI in the transmitted message based on the virtual NIU index that was stored in the message, and the message is sent as per the protocol being followed by the communication system.

If the application decides (based on virtual NIU index and/or message type) that this message is to be handled by the message simulator, the application will re-direct the message towards the message simulator. Once the message simulator has received the message, it has access to the virtual NIU index and can determine what it wants to do with this message, for instance, sending a reply (see below).

Handling an Upstream Message Originating from the Message Simulator

All non-control messages received by the super NIU from the message simulator are treated as messages to be sent to the HDT. This greatly simplifies super NIU message handling, since the super NIU will handle such messages in exactly the same manner as those generated by internal applications, since the virtual NIU index contained within the message is used to populate the DLCI field in the transmitted message. Whenever the super NIU transmits a message to the HDT, the super NIU looks up the virtual NIU index in the message using the super NIU's virtual NIU database and converts it to the DLCI which is used by the HDT. As such, it does not matter whether the message was originated by the message simulator (i.e., the PC) or by the super NIU.

Recovery from Received Signal Failed

On recovery from a prolonged received signal failed (RSF) condition, the host NIU will automatically re-range and cause another activate virtual NIU reply message to be sent to the message simulator. It is then up to the message simulator to (re)activate all virtual NIUs that are supposed to be active (by sending activate virtual NIU request messages to the super NIU, complete with appropriate cause value), just as if they had been newly created. The cause value corresponds to information in the ranging burst that identifies why the host NIU is re-ranging. In the super NIU, the cause value is provided by the message simulator. This greatly simplifies the super NIU's handling of RSF, since it allows it to simply clear its virtual NIU database every time RSF is entered, at which point the recovery procedures are identical to creating new virtual NIUs, as described earlier.

At the beginning of an RSF condition, the super NIU sends an enter RSF command message to the message simulator to notify it that the super NIU cannot currently receive or send messages for any virtual NIU. This enter RSF command message allows the message simulator to update its graphical user interface to notify the user of the current unavailability of the virtual NIUs.

Deleting a Virtual NIU

As well as autonomously deleting all virtual NIUs on reset or RSF, any individual virtual NIU can also be deleted on command from the message simulator via the delete viral NIU command message. This implies that the corresponding entries in the super NIU's database are removed, which causes any subsequent message from either the HDT or the message simulator with that virtual NIU's original DLCI or index to be ignored, as if that virtual NIU was an actual NIU that has been removed from the system.

NIU-PC Simulator Interface

All messages that are passed between the super NIU and message simulator use the virtual NIU index to indicate which virtual NIU the message was received or sent from.

A number of control messages are defined for use between the super NIU and message simulator only. They follow the same format as all HDT/NIU messages, i.e., the standard message header followed by application dependent data.

Activate Virtual NIU Request From message simulator to super NIU; create new virtual NIU (if it doesn't already exist) and initiate ranging for that virtual NIU. Sending this message to the host NIU (index #0) is interpreted as an active/inactive request; the super NIU responds with a general acknowledgment or general non-acknowledgment, as appropriate.

Activate Virtual NIU Reply From super NIU to message simulator, virtual (or host) NIU received a startup request message in response to ranging burst, and sent a startup reply message. Associates NIU ID and DLCI with virtual NIU index. Also sent when host NIU (virtual NIU index #0) starts up following reset or following recovery from RSF.

Delete Virtual NIU Command From message simulator to super NIU; delete virtual NIU (#0 can not be deleted). The super NIU responds with a general acknowledgment message when the virtual NIU has been deleted.

Enter RSF Command From super NIU to message simulator; sent on entering RSF state to notify message simulator that the super NIU is no longer capable of receiving or sending application messages. Control message such as the ones shown above are still valid however. Although only sent for NIU #0, it applies to all virtual NIUs.

Message Simulator

As described earlier, the message simulator implemented on PC 208 of FIG. 2 is designed to simulate the operations of one or more NIUs for the HFC-2000® system. The message simulator (in conjunction with super NIU 200 of FIG. 2) takes the place of many hardware units at once, allowing system testing to be done at high loading conditions. The message simulator allows one PC with two serial ports to take the place of up to 240 NIUs (with up to 120 NIUs per coaxial run) for system test purposes when executing two instances of the message simulator software. Since an NIU is about the size of a large toaster, one PC combined with two super NIUs takes the place of 10 seven-foot frames, thereby addressing testing problems related to space, hardware availability, and cost. Of course, in other configurations, even more than 240 NIUs could be simulated by a super NIU of the present invention.

In addition to its super NIU functions, the message simulator also allows a user to create messages, send them over a datalink, and receive and display incoming messages. The message simulator provides the following functions:

Define each message: its purpose, its fields, and the assigned developers on the NIU and on the HDT;

Enter data to define instances of specific messages;

Send sequences of messages to the target processor (e.g., the super NIU) with options for repeating the sequences and adjusting the timing of the sequences and/or the messages within the sequences;

Define message sequences in files that may be re-used;

Capture response messages that are sent from the target processor, and display their content in a convenient format; and Create manual pages for each message.

The message simulator is capable of acting as many NIUs for simulating conditions of ranging and re-ranging, NIU service state (i.e., in service or out of service), and received signal failed (RSF) condition on multiple virtual NIUs. The message simulator can be used during system testing to create various loading conditions to the HDT. The message simulator is an array of finite state machines that implement high-level NIU behavior.

Figure 4:
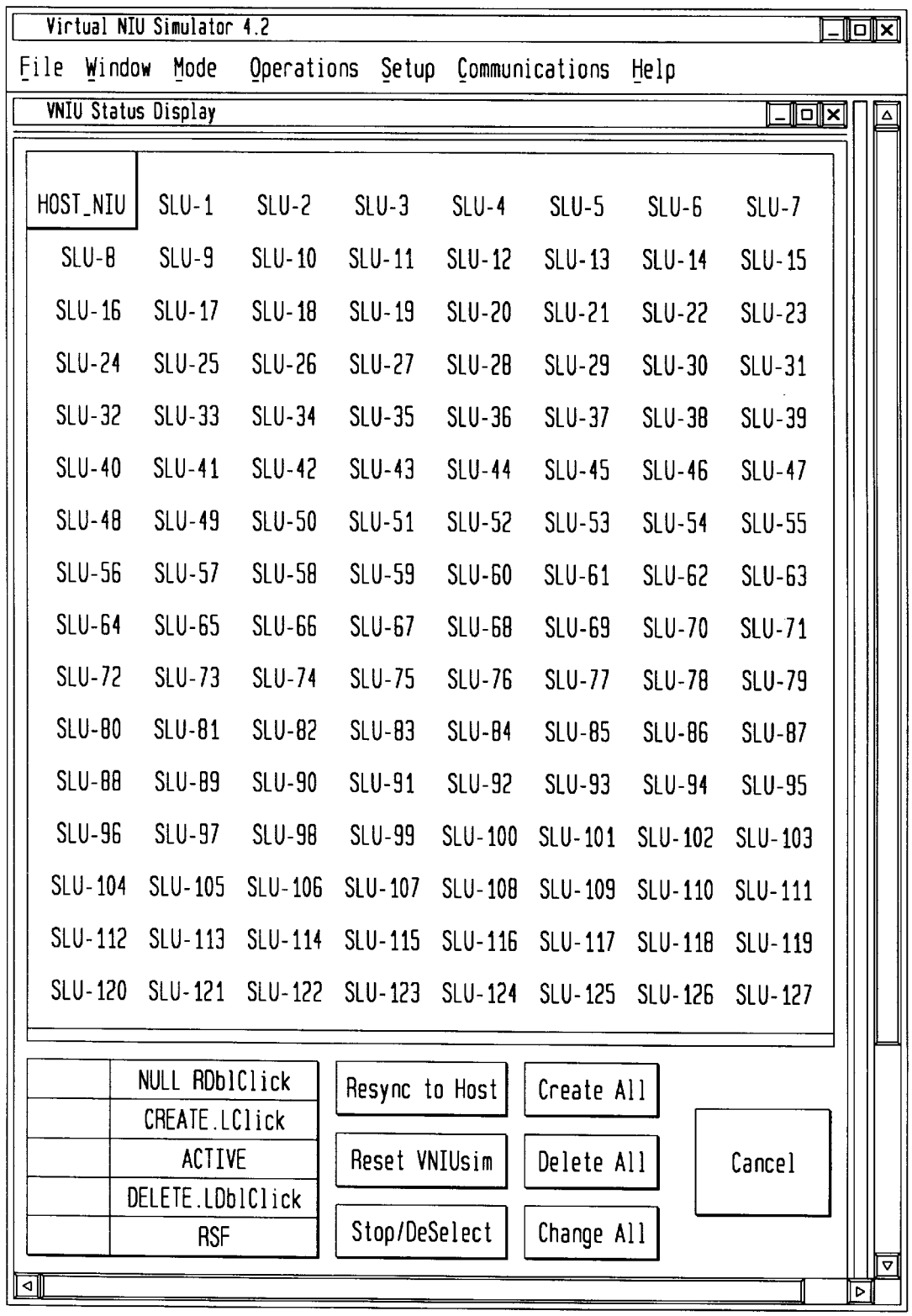
FIG. 4 shows a visual display of actual and virtual NIUs generated by the message simulator implemented on the personal computer of FIG. 2.

FIG. 4 shows a visual display of 128 NIUs (1 host NIU and up to 127 virtual NIUs) generated by the message simulator, according to one embodiment of the present invention. Clicking on a cell or group of cells allows operations on the corresponding NIUs. The color of each cell (not shown) indicates the state of the corresponding NIU (e.g., active, inactive). With a standard PC with two serial ports, two instances of the message simulator can be configured to two super NIUs to simulate up to 240 NIUs of two BCGs.

Although the present invention has been described in the context of testing an HDT of the HFC-2000® communication system, it will be understood that the present invention can be implemented in other contexts as well. For example, the super NIU of the present invention can be used to test components of the HFC-2000® system other than the HDT. Similarly, the super NIU can be used in the field to install and verify the operations of HFC-2000® equipment. The present invention can also be implemented as super NIUs designed for communication systems other than the HFC-2000® system.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for testing a component of a communication system, comprising:

(a) an actual network interface unit (NIU), configured to transmit and receive signals to and from the component; and (b) a computer configured to transmit and receive signals to and from the actual NIU and programmed to simulate operations of a plurality of virtual NIUs, wherein:

the actual NIU is configured to receive downstream signals from the component intended for the virtual NIUs;

the actual NIU and the computer are configured to process the downstream signals for the virtual NIUs;

the actual NIU and the computer are configured to generate upstream signals from the virtual NIUs; and the actual NIU is configured to transmit the upstream signals from the virtual NIUs to the component, wherein, from the perspective of the component, the component appears to be communicating with a plurality of actual NIUs.

2. The apparatus of claim 1, wherein the communication system is a hybrid fiber/coax (HFC) communication system.

3. The apparatus of claim 1, wherein the component is a host digital terminal (HDT).

4. The apparatus of claim 1, wherein the computer is further programmed to generate one or more graphical user interfaces indicative of status of the virtual NIUs.

5. The apparatus of claim 1, wherein, from the perspective of the component, the component also appears to be communicating with the actual NIU.

6. The apparatus of claim 1, wherein the computer is configured to implement a discrete state machine for each virtual NIU.

7. The apparatus of claim 1, wherein one or more of the virtual NIUs correspond to different types of NIUs.

8. The apparatus of claim 7, wherein the different types of NIUs correspond to different NIU hardware versions.

9. The apparatus of claim 7, wherein the different types of NIUs correspond to different NIU software versions.

10. The apparatus of claim 1, wherein the apparatus is configured to keep track of a unique identification number for each virtual NIU.

11. The apparatus of claim 1, wherein:

for some downstream messages intended for the virtual NIUs, the actual NIU is configured to process the downstream messages without assistance from the computer, generate any necessary upstream messages from the virtual NIUs, and transmit the upstream messages to the component; and for other downstream messages intended for the virtual NIUs:

the actual NIU is configured to transmit the downstream messages to the computer;

the computer is configured to process the downstream messages, generate any necessary upstream messages from the virtual NIUs, and transmit the upstream messages to the actual NIU; and the actual NIU is configured to transmit the upstream messages to the component.

12. The apparatus of claim 11, wherein the actual NIU is configured to process downstream messages intended for virtual NIUs that are hardware-affecting NIU functions without assistance from the computer.

13. The apparatus of claim 1, wherein:

the communication system is an HFC communication system;

the component is an HDT;

the computer is further programmed to generate one or more graphical user interfaces indicative of status of the virtual NIUs;

from the perspective of the HDT, the HDT also appears to be communicating with the actual NIU;

the computer is configured to implement a discrete state machine for each virtual NIU;

one or more of the virtual NIUs correspond to different types of NIUs;

the apparatus is configured to keep track of a unique identification number for each virtual NIU;

for downstream messages intended for the virtual NIUs that are hardware-affecting NIU functions, the actual NIU is configured to process the downstream messages without assistance from the computer, generate any necessary upstream messages from the virtual NIUs, and transmit the upstream messages to the HDT; and for other downstream messages intended for the virtual NIUs:
the actual NIU is configured to transmit the downstream messages to the computer;
the computer is configured to process the downstream messages, generate any necessary upstream messages from the virtual NIUs, and transmit the upstream messages to the actual NIU; and
the actual NIU is configured to transmit the upstream messages to the HDT.

14. A method for testing a component of a communication system using test equipment comprising:
(a) an actual network interface unit (NIU), configured to transmit and receive signals to and from the component; and
(b) a computer configured to transmit and receive signals to and from the actual NIU and programmed to simulate operations of a plurality of virtual NIUs, wherein the method comprises the steps of:
(1) the actual NIU receiving downstream signals from the component intended for the virtual NIUs;
(2) the actual NIU and the computer handling the downstream signals for the virtual NIUs;
(3) the actual NIU and the computer generating upstream signals from the virtual NIUs; and
(4) the actual NIU transmitting the upstream signals from the virtual NIUs to the component, wherein, from the perspective of the component, the component appears to be communicating with a plurality of actual NIUs.

15. The method of claim 14, wherein the communication system is a hybrid fiber/coax (HFC) communication system.

16. The method of claim 14, wherein the component is a host digital terminal (HDT).

17. The method of claim 14, further comprising the step of the computer generating one or more graphical user interfaces indicative of status of the virtual NIUs.

18. The method of claim 14, wherein, from the perspective of the component, the component also appears to be communicating with the actual NIU.

19. The method of claim 14, further comprising the step of the computer implementing a discrete state machine for each virtual NIU.

20. The method of claim 14, wherein one or more of the virtual NIUs correspond to different types of NIUs.

21. The method of claim 20, wherein the different types of NIUs correspond to different NIU hardware versions.

22. The method of claim 20, wherein the different types of NIUs correspond to different NIU software versions.

23. The method of claim 14, wherein the test equipment keeps track of a unique identification number for each virtual NIU.

24. The method of claim 14, wherein:
for some downstream messages intended for the virtual NIUs, the actual NIU processes the downstream messages without assistance from the computer, generates any necessary upstream messages from the virtual NIUs, and transmits the upstream messages to the component; and for other downstream messages intended for the virtual NIUs:
the actual NIU transmits the downstream messages to the computer;
the computer processes the downstream messages, generates any necessary upstream messages from the virtual NIUs, and transmits the upstream messages to the actual NIU; and
the actual NIU transmits the upstream messages to the component.

25. The method of claim 24, wherein the actual NIU processes downstream messages intended for virtual NIUs that are hardware-affecting NIU functions without assistance from the computer.

26. The method of claim 14, wherein:
the communication system is an HFC communication system;
the component is an HDT;
the computer is further programmed to generate one or more graphical user interfaces indicative of status of the virtual NIUs;
from the perspective of the HDT, the HDT also appears to be communicating with the actual NIU;
the computer implements a discrete state machine for each virtual NIU;
one or more of the virtual NIUs correspond to different types of NIUs;
the test equipment keeps track of a unique identification number for each virtual NIU;
for downstream messages intended for the virtual NIUs that are hardware-affecting NIU functions, the actual NIU processes the downstream messages without assistance from the computer, generates any necessary upstream messages from the virtual NIUs, and transits the upstream messages to the HDT; and for other downstream messages intended for the virtual NIUs:
the actual NIU transmits the downstream messages to the computer;
the computer processes the downstream messages, generates any necessary upstream messages from the virtual NIUs, and transmits the upstream messages to the actual NIU; and
the actual NIU transmits the upstream messages to the HDT.

* * * * *